United States Patent [19]

Fatehi et al.

[11] Patent Number: 5,815,613
[45] Date of Patent: Sep. 29, 1998

[54] OPTICAL SWITCHED DISTRIBUTOR

[75] Inventors: Mohammad T. Fatehi, Middletown; Wayne Harvey Knox, Rumson, both of N.J.

[73] Assignee: Lucent Technologies Inc., Murray Hill, N.J.

[21] Appl. No.: 777,894

[22] Filed: Dec. 31, 1996

[51] Int. Cl.[6] .................................................. G02B 6/26
[52] U.S. Cl. .............................. 385/22; 385/16; 385/24; 372/69; 359/341
[58] Field of Search ............................. 385/22, 16–24, 385/126, 127; 372/69, 6; 359/341, 337

[56] References Cited

U.S. PATENT DOCUMENTS

| | | | |
|---|---|---|---|
| 5,181,134 | 1/1993 | Mohammad et al. | 359/117 |
| 5,491,581 | 2/1996 | Roba | 385/127 X |
| 5,633,961 | 5/1997 | Kirkby et al. | 385/16 |

OTHER PUBLICATIONS

Pending Patent Application 08/579529, filed on Dec. 27, 1995, allowed on Nov. 4, 1997, Batch No. T79, by Mohammad T. Fatehi and Fred Ludwig Heismann, titled "Maintenance of Optical Networks". Now U.S. patent #5,745,274.

Primary Examiner—Phan T. H. Palmer
Attorney, Agent, or Firm—Thomas Stafford; Gregory J. Murgia

[57] ABSTRACT

A gain-switched optical distributor, i.e., commutator, is realized by employing an optical rare earth-doped fiber optical amplifier as the switching element per se. Each of the optical rare earth-doped fiber optical amplifiers acts as an ON/OFF switch. Also, the gain-switched optical distributor of this invention is a natural fit into today's optically amplified optical communication systems. In one embodiment, this is realized by employing a pump select circuit in conjunction with a plurality of pumps and a plurality of corresponding rare earth-doped fiber optical amplifiers. The particular pump and corresponding amplifier is selected by use of a monitor arrangement to determine which signal is to be selected and routed to an output. In another embodiment, a so-called tuned pump arrangement is employed in conjunction with a plurality of filters and a corresponding plurality of rare earth-doped fiber optical amplifiers. A pump tuning arrangement is employed to control the tunable pump in order to select the appropriate one of a plurality of optical input signals at any of a plurality of given wavelengths.

9 Claims, 3 Drawing Sheets

OPTICAL SWITCHED DISTRIBUTOR

RELATED APPLICATIONS

U.S. patent applications Ser. No. 08/777,891 (M. T. Fatehi-W. H Knox Case 16-21), Ser. No. 08/777,890 (M. T. Fatehi-W. H. Knox Case 12-17), and Ser. No. 08/777,892 (M. T. Fatehi-W. H. Knox Case 18-23) were filed concurrently herewith.

TECHNICAL FIELD

This invention relates to optical communication elements, and more, specifically, to optical distributors, also known as optical commutators.

BACKGROUND

An electrical 1×N distributor, i.e., commutator, switch is an 1×N switching device which routes the signal or signals from a single input port to any one of the N output ports, as shown in FIG. 1. An optical 1×N distributor switch is the optical analog of the electrical 1×N distributor switch where the input and output ports are optical fibers carrying one or more optical communication signals at a given wavelength or a plurality of wavelengths. Certain distributor switches may permit routing the signal from the input line to two or more of the N output ports, thus dividing the signal energy from the input line among the target output ports. This properly is called the broadcasting or bridging capability of the distributor switch.

Prior known distributors employed mechanical switching elements. Such prior arrangements employing mechanical distributors were limited in selecting only one output line at a time, their speed was slow, and their reliability was less than desirable. One such arrangement is shown in FIG. 1 where an incoming optical fiber line 100 is supplied to the distributor 101 and switching element 103. Switching element 103, under control of actuator 102, then would route optical signal or signals on the fiber lines 100 to one of the output optical lines 104-1 through 104-N.

A number of electromechanical optical distributor switches are presently available. These devices are based on mechanically moving the input and/or output fibers or utilizing various reflective or deflective optical elements to spatially direct a beam of light from the exit pupil of the input fiber and routing it to the entrance pupils of the output fibers. Clearly, these mechanical switches are slow and, in most cases, do not permit broadcast capability, a desirable feature in communication systems. In some cases, the optical loss associated with these elements is significant.

Solid state wave-guide distributor switches based on lithium niobate (see for example U.S. Pat. No. 5,181,134) or indium phosphide optical switching devices are also available which solve the speed problems. The drawback involved with these optical switching devices include polarization dependence and significant optical losses. The large optical insertion losses connected with these devices soon become intolerable when such devices are concatenated.

SUMMARY OF THE INVENTION

The problems and limitations of the prior known mechanical distributors and various solid state optical distributors are overcome, in one embodiment of the invention, by employing an optical rare earth-doped fiber optical amplifier as the switching element per se, of a gain-switched optical distributor. Each of the optical rare earth-doped fiber optical amplifiers acts as an ON/OFF switch. Also, the gain-switched optical distributor of this invention is a natural fit into today's optically amplified optical communication systems. In one embodiment, this is realized by employing a pump select circuit in conjunction with a plurality of pumps and a plurality of corresponding rare earth-doped fiber optical amplifiers. The particular pump and corresponding optical amplifier are selected by use of a monitor arrangement to determine which output port or ports is (are) connected to the input port. In another embodiment, a so-called tuned pump arrangement is employed in conjunction with a plurality of filters and a corresponding plurality of rare earth-doped fiber optical amplifiers. A pump tuning arrangement is employed to control the tunable pump in order to select the appropriate one of a plurality of optical amplifiers to be activated, thus routing the input signals at any of a plurality of given wavelengths to the corresponding output line (or lines if broadcasting capability is employed).

DETAILED DESCRIPTION

Figure 1:
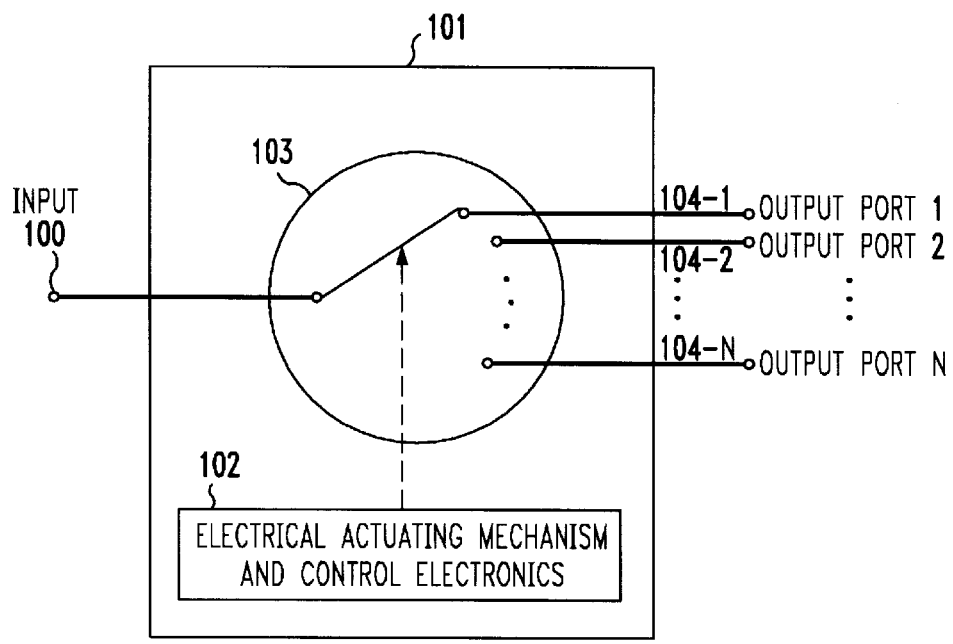
FIG. 1 is a prior art electro-mechanical distributor arrangement.
Figure 2:
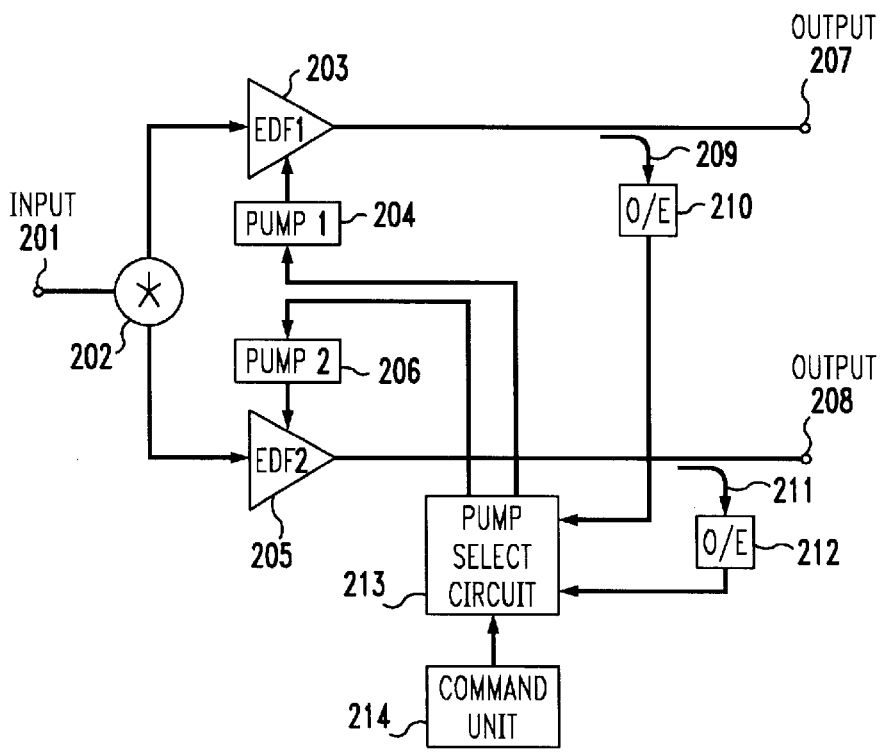
FIG. 2 illustrates one embodiment of the invention employing so-called switched pumps with rare earth-doped optical fiber amplifiers.

FIG. 2 shows in simplified form an embodiment of the invention including optical fiber line 201 which supplies optical signals at predetermined wavelengths or sets of wavelengths to rare earth-doped fiber optical amplifier (herein after "amplifier") 203 and amplifier 204, respectively, via the optical star coupler (herein after "coupler") 202. The rare earth-doped fiber can be, for example, a length of erbium-doped fiber coupled to a wavelength selective coupler, for example, a wavelength division multiplexed coupler, through which a pump is coupled thereto. Further note that loss is equalized by the length of the rare earth-doped fiber and gain is equalized by the pump power. As shown, pump 204 is coupled to amplifier 203, and pump 206 is coupled to amplifier 205. As is known in the art, each of pumps 204 and 206, respectively, powers amplifiers 203 and 205. Additionally, the pumping can be co-directional or counter directional. Indeed, the pumping could also be bi-directional. The inputs of the amplifiers 203 and 205 are identical copies of the input signal on line 201 provided by coupler 202, which in this example is a 2×N coupler, in well-known fashion. The outputs of the amplifiers 203 and 204 are connected to the output ports 207 and 208 via the optional optical monitoring taps (herein after "taps") 209 and 211. Taps 209 and 211 tap off a small fraction (for example 1–10%) of the output optical signals and rout the optical signals to the photodetectors (optical to electrical converters, O/E) 210 and 212, respectively. O/Es 210 and 212 help in the processes of determining which of amplifiers 203 and 204 are currently selected by the power level of the selected line and determining the parameters and identification (ID) tags associated with selected lines (see for example, co-pending U.S. patent application Ser. No. 08/579529, filed Dec. 27, 1995). The information from O/Es 210 and 212 are supplied to pump selector circuit 213 which then selects either pump 204 or pump 206, in accordance with desired parameters, and commands from the command and control unit 214. It should be noted, however, that this monitoring arrangement is optional and other optical monitoring and control arrangements known in the art may be equally employed. This will be apparent to those skilled in the art. Also supplied to pump select circuit 213 are command and control information from command and control unit 214 which is utilized with information from other network elements in an optical system in order to select which of pumps 204 or 206 is to be selected and, accordingly, which of amplifiers 203 or 205 will be switched ON and which will be switched OFF. It should be noted, however, that although we have shown the employment of O/Es 210 and 212, in this example, that other arrangements may be employed to monitor different parameters in order to select which of pumps 204 and 206 and, accordingly, which of amplifiers 203 and 205 will be switched ON.

Figure 3:
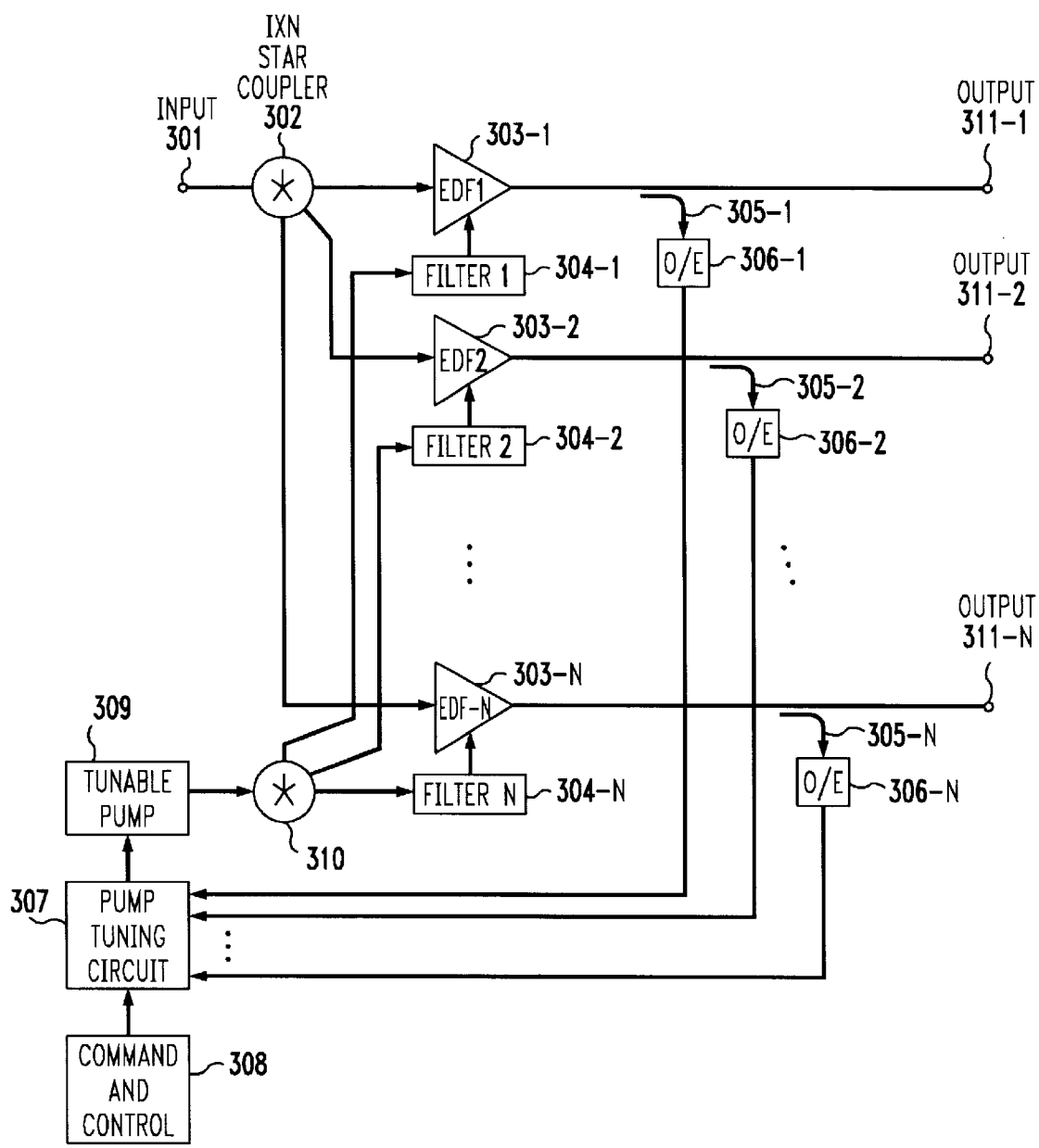
FIG. 3 shows a tuned-pump arrangement including rare earth-doped fiber optical amplifiers.

FIG. 3 shows in simplified form another embodiment of the invention for an input optical fiber line 301 to be distributed to a plurality of output optical fiber lines 311-1 through 311-N and a corresponding plurality of amplifiers 303-1 through 303-N. In this embodiment of the invention, only one tunable pump 309 is required which gives us the technical advantage of cost savings. Associated with tunable pump 309 are another optical star coupler (herein after "coupler") 310 and a plurality of fixed (or presetable) optical band pass filters (herein after "filters") 304-1 through 304-N which are associated on a one-to-one basis with amplifiers 302-1 through 302-N, respectively. In practice, these filters, 302-1 through 302-N, may be built into the wavelength selective coupler(s) that are used to build the amplifiers 303-1 through 303-N (see the literature for structural details of various optical amplifier designs). Again, the outputs of amplifiers 302-1 through 302-N are supplied to the optional taps 305-1 through 305-N for the purpose of being monitored for integrity by the monitors 306-1 through 306-N, prior to being routed to the system output ports 311-1 through 311-N. Again, the outputs of the O/E devices 306-1 through 306-N are combined in the pump tuning circuit 307 with information from the command and control unit 308 to tune the wavelength of the tunable pump 309.

Figure 4:
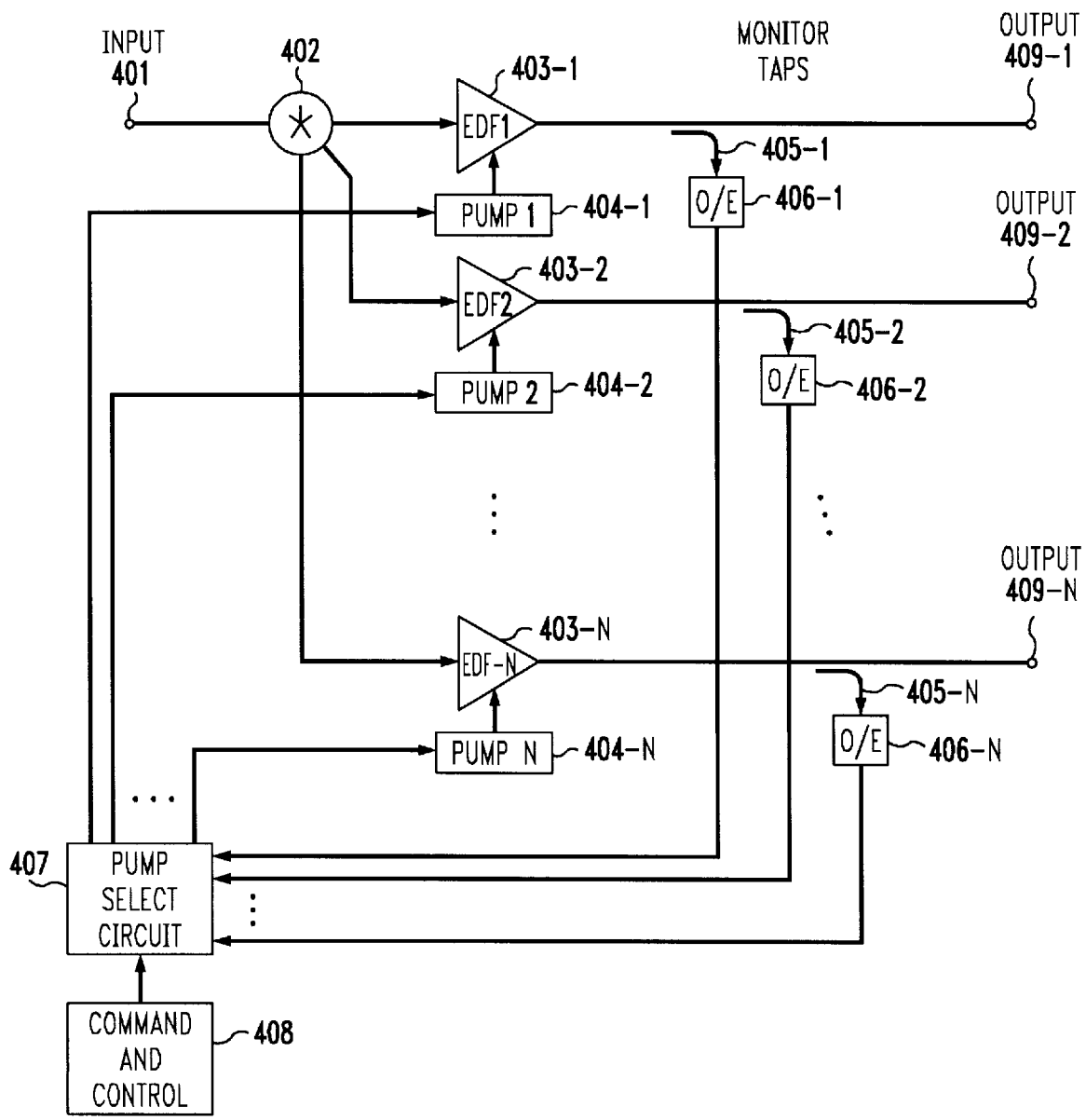
FIG. 4 shows a switched-pump arrangement including a plurality of pumps and corresponding rare earth-doped fiber amplifiers.

FIG. 4 shows a simplified block diagram form another embodiment of the invention employing a single input line 401 and a plurality of output optical fiber lines 409-1 through 409-N and a corresponding plurality of amplifiers 403-1 through 403-N. In this embodiment of the invention, a corresponding plurality of pumps 404-1 through 404-N are associated with amplifiers 403-1 through 403-N, respectively. Again, the outputs of amplifiers 403-1 through 403-N are supplied to the taps 405-1 through 405-N for the purposed of being monitored for integrity by the O/Es 406-1 through 406-N, prior to being routed to the system output ports 409-1 through 409-N. Again, the outputs of the O/E devices 406-1 through 406-N are combined in the pump select circuit 407 with information from the command and control unit 408 to activate one (or more, if broadcast is desired) of the pumps 404-1 though 404-N and, consequently, then the turning the corresponding amplifier(S) 403-1 though 403-N ON or OFF. It should be noted, however, that other optical coupling and monitoring arrangements known in the art may be equally employed in place of optical couplers 405-1 through 405-N and the associated components. This will be apparent to those skilled in the art. Specifically, in this example, O/Es 403-1 through 403-N each monitor the power level of an output signal on an associated one of output fibers 405-1 through 405-N, and determines the parameters and ID tags associated with that signal for verification of the operation and quality of the distributor switch.

What is claimed is:

1. An optical distributor for coupling into an optical fiber system, the optical distributor having an input and a plurality of outputs comprising:
   a plurality of fiber optical amplifiers corresponding to the plurality of outputs, each employed as a switching element;
   a coupling element for coupling an incoming optical signal to each of the plurality of fiber optical amplifiers; and
   a pump arrangement responsive to a command signal for optically controlling ON/OFF states of each of said plurality of fiber optical amplifiers so that the incoming optical signal is supplied to one or more of said plurality of outputs.

2. The optical distributor of claim 1 wherein each of the fiber optical amplifiers comprises an optical rare earth-doped fiber having a predetermined length and a corresponding pump responsive to the command signal for turning the fiber optical amplifier ON/OFF.

3. The optical distributor of claim 2 wherein the fiber is doped with erbium.

4. The optical distributor of claim 2 wherein the pump arrangement associated with the rare earth-doped fiber is arranged to provide co-directional pumping of the rare earth-doped fiber optical amplifier.

5. The optical distributor of claim 2 wherein the pump arrangement associated with the rare earth-doped fiber is arranged to provide counter directional pumping of the rare earth-doped fiber optical amplifier.

6. An optical distributor for coupling into an optical fiber system, the optical distributor having an input and a plurality of outputs comprising:
   a plurality of fiber optical amplifiers corresponding to the plurality of outputs, each employed as a switching element, wherein each of the fiber optical amplifiers comprises an optical rare earth-doped fiber having a predetermined length and a corresponding filter;
   a coupling element for coupling an incoming optical signal to each of the plurality of fiber optical amplifiers; and
   a pump arrangement responsive to a command signal for optically controlling ON/OFF states of each of said plurality of fiber optical amplifiers so that the incoming optical signal is supplied to one or more of said plurality of outputs, the pump arrangement including a tunable pump and a pump tuning circuit and a coupler for coupling an output from the tunable pump to each of the filters corresponding to the plurality of fiber optical amplifiers, the pump tuning circuit being responsive to command and control signals for controlling the tunable pump to supply pumping signals for turning ON/OFF one or more of the plurality of fiber optical amplifiers, the filters filtering the pump signal to effect the turning ON/OFF of the one or more of the plurality of fiber optical amplifiers.

7. The optical distributor of claim 6 wherein the fiber is doped with erbium.

8. The optical distributor of claim 6 wherein the pump arrangement associated with the rare earth-doped fiber is arranged to provide co-directional pumping of the rare earth-doped fiber optical amplifier.

9. The optical distributor of claim 6 wherein the pump arrangement associated with the rare earth-doped fiber is arranged to provide counter directional pumping of the rare earth-doped fiber optical amplifier.

* * * * *